United States Patent [19]

Kakeno

[11] 4,321,608

[45] Mar. 23, 1982

[54] DEFLECTION PLATE ARRAY

[75] Inventor: Sadao Kakeno, Yokohama, Japan

[73] Assignee: Ricoh Company, Ltd., Tokyo, Japan

[21] Appl. No.: 180,658

[22] Filed: Aug. 25, 1980

[30] Foreign Application Priority Data

Sep. 3, 1979 [JP] Japan .............................. 54-112585

[51] Int. Cl.³ ........................................ G01D 15/18

[52] U.S. Cl. ................................................ 346/75

[58] Field of Search .................................... 346/75

[56] References Cited

U.S. PATENT DOCUMENTS

| | | | |
|---|---|---|---|
| 3,786,517 | 1/1974 | Krause | 346/75 |
| 4,167,741 | 9/1979 | Heard et al. | 346/75 |
| 4,175,266 | 11/1979 | Nakano et al. | 346/75 |
| 4,258,370 | 3/1981 | Paranjpe | 346/75 |

OTHER PUBLICATIONS

Haskell et al., "deflecting plate . . . Printer", IBM Tech. Dis. Bul., vol. 12, No. 11, 4/1970.

*Primary Examiner*—John Gonzales

*Attorney, Agent, or Firm*—Burgess, Ryan and Wayne

[57] ABSTRACT

A deflection plate array for electrostatic deflection type ink-jet printers is provided in which a plurality of deflection plates each consisting of an insulating substrate and thin-film electrodes formed on the major surfaces thereof, respectively, and a plurality of insulating spacers are interleaved in such a way that the portion of each deflection plate bearing the thin-film electrodes is extended downward beyond the bottom of the corresponding spacer; and two electrode rods are extended through the array of interleaved deflection plates and spacers in such a way that one of the electrode rods is electrically connected to one of the thin-film electrodes on one surface of each deflection plate while the other electrode rod is electrically connected to the other thin-film electrode on the other surface of the deflection plate.

5 Claims, 10 Drawing Figures

DEFLECTION PLATE ARRAY

BACKGROUND OF THE INVENTION

The present invention relates to an improved deflection plate array for electrostatic type ink-jet printers.

In the deflection plate arrays of the type described, deflection plate pairs which are equal in number to nozzles and are applied with a high voltage must be arrayed in very closely spaced apart relationship. Therefore, it is extremely hard to space them with a predetermined distance with a higher degree of dimensional tolerance and to ensure them against electrical failures. For instance, with a nozzle array consisting of 60 nozzles spaced apart from each other by 5 mm, 60 electrode pairs must be spaced apart from each other by a predetermined distance with a dimensional tolerance of $\pm 0.3$ mm over the width of 300 mm. In addition, a high voltage of 2 to 4 kV is applied across the deflection plate pair in the humid space with vapor evaporated from ink drops, so that a higher degree of electrical isolation between the deflection plate pairs must be established and suitable measures must be taken to ensure against electrical failures. When the deflection plate pairs are contaminated with the ink drops, they must be cleaned with water or any other suitable cleaning agent in order to prevent the degradation in printing quality. Therefore, it is very important in the design of the deflection plate array that efficient maintainability is ensured and the degradation in electrical isolation between the adjacent deflection plates will not result from the cleaning.

SUMMARY OF THE INVENTION

The present invention was made to overcome the above and other problems encountered in the prior art deflection plate array.

To this end, briefly stated, the present invention provides a deflection plate array in which a plurality of deflection plates each consisting of an insulating substrate and thin-film deflection electrodes formed over the major surfaces thereof, respectively, and a plurality of insulating spacers are interleaved so that the spacing between the adjacent deflection plates can be determined with a higher degree of dimensional accuracy and in such a way that the portion of the deflection plate bearing the thin-film electrodes is extended downward beyond the bottom of the corresponding insulating spacer; and two electrode rods are extended through the array of interleaved deflection plates and insulating spacers in such a way that one of the two electrode rods is electrically connected to one of the thin-film electrodes on one major surface of each deflection plate while the other electrode rod is electrically connected to the other thin-film electrode on the other major surface of the deflection plate, whereby safety can be ensured. In addition, the deflection plates are coated with insulating films except the thin-film electrodes so that the degradation in electrical insulation resulting from the cleaning of deflection plates can be avoided.

According to the present invention, the deflection plates and the insulating spacers are interleaved so that they can be arrayed with a higher degree of dimensional accuracy and the paths between the deflection electrodes can be aligned with the corresponding nozzles also with a higher degree of accuracy. A high voltage is supplied to the thin-film deflection electrodes on the deflection plates through the electrode rods which also serve as stud bolts for securely holding the array of interleaved deflection plates and insulating spacers. As a result, the majority of high voltage connections is avoided from being contact with the damp surrounding atmosphere so that safety can be ensured. In addition, as described above, except the thin-film electrodes, the deflection plates are coated with insulating films so that no degradation in electrical insulation results from the cleaning of the deflection plates with water or any other cleaning agent. Furthermore, the time required for connecting the deflection plates to a high voltage source can be drastically reduced so that considerable cost saving can be attained.

DESCRIPTION OF THE PREFERRED EMBODIMENTS

Figure 1A:
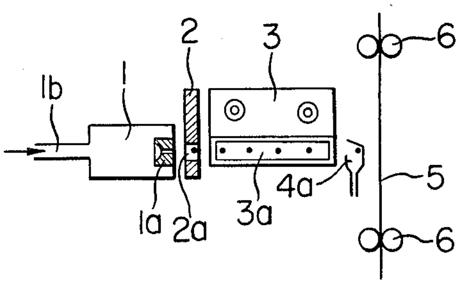
FIG. 1A is a schematic side view of a print head incorporating a deflection plate array in accordance with the present invention.
Figure 1B:
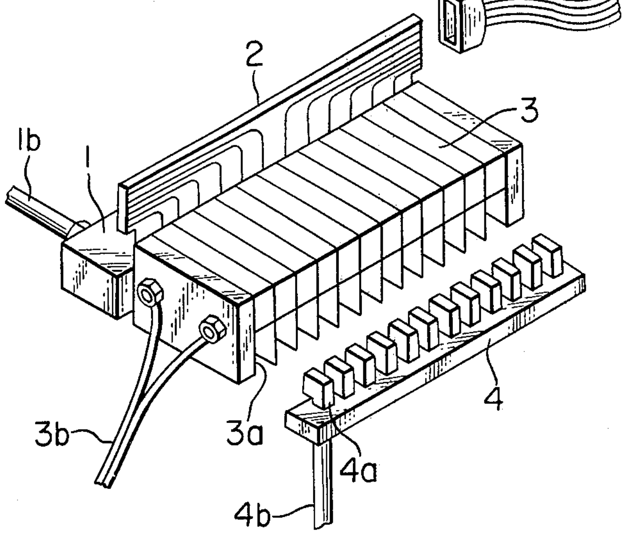
FIG. 1B is a perspective view of the deflection plate array and a gutter array.

FIGS. 1A and 1B show a print head array of an ink-jet printer of the type having a deflection plate array. Reference numeral 1 denotes a nozzle array; 2, a charge electrode array; 2*a*, a charge electrode; 2*b*, a connector for connecting the charge electrode array 2 to a power source or an analog-modulated charge voltage generator (not shown); 3, a deflection plate array; 3*a*, a deflection plate; 3*b*, wires for connecting the deflection plate array 3 to a deflection voltage source (not shown); 4, a gutter array; 4*a*, a gutter; 5, a recording paper; and 6, feed roller pairs for feeding the paper 5.

The nozzle array 1 has a plurality of nozzles 1*a* spaced apart by a predetermined distance from each other, and every nozzle 1*a* is aligned with the charge electrode 2*a*, the deflection plate 3*a* and the gutter 4*a*.

The nozzle array 1 is supplied with the ink through an ink supply tube 1*b*, and jets of ink are issued through the nozzles 1*a* and broken up into ink drops. When the ink drops pass through the charge electrode 2*a*, they are selectively charged or uncharged. If an ink drop is charged, it is deflected toward the paper 5 by the deflection electrode 3 and lands on it leaving a dot. If an ink drop is uncharged, it proceeds straight to the gutter 4*a* and is recirculated through an ink recirculation tube 4*b*. In some ink-jet printers, the charged drops are steered to the gutters while the uncharged drops proceed straight to the paper 5.

Figure 2A:
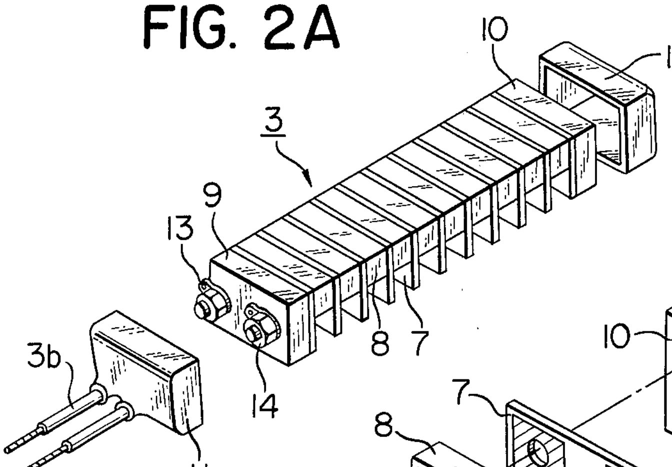
FIG.2A is a perspective view of the sub-assembly of interleaved deflection plates and insulating spacers.
Figure 2B:
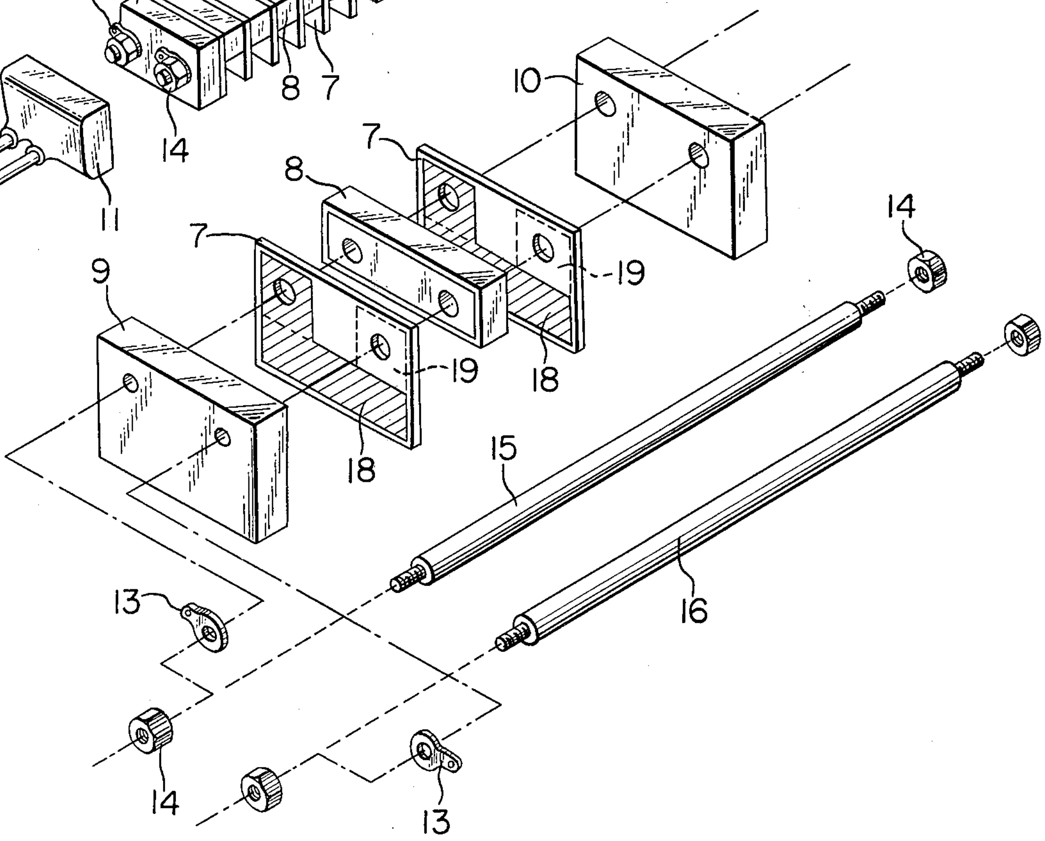
FIG. 2B is an exploded view thereof.

FIG. 2A shows a perspective view of the deflection plate array 3 which is completely assembled while FIG. 2B shows an exploded view thereof. Reference numeral 7 denotes a deflection plate; 8, a spacer; 9 and 10, deflection plate retainers; 11 and 12, waterproof rubber caps; 13, a terminal; 14, a nut; and 15 and 16, electrode rods.

Figure 3:
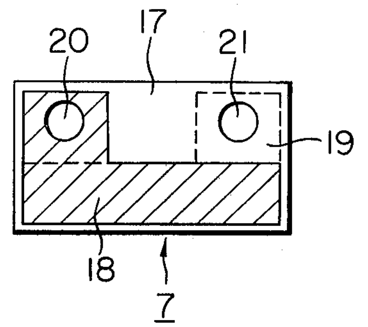
FIG. 3 is a front view of a deflection plate.

As shown in FIG. 3, the deflection plate 7 consists of an insulating substance of ceramic such as alumina. Thin-film electrodes 18 and 19 of a corrosion resistant alloy are formed on the major surfaces, respectively, of the substrate 17 by the vacuum evaporation processes or by printing an electrically conductive paint containing precious metals and then baking. The substrate 17 is further formed with electrode rod holes 20 and 21 through which are extended the electrode rods 15 and 16, respectively. The thin-film electrodes 18 and 19 are so extended as to completely surround these holes 20 and 21. In order to make the deflection plate 7 waterproof, the surfaces thereof except the thin-film electrodes 18 and 19 are coated with an insulating resin such as polyimide.

Figure 4A:
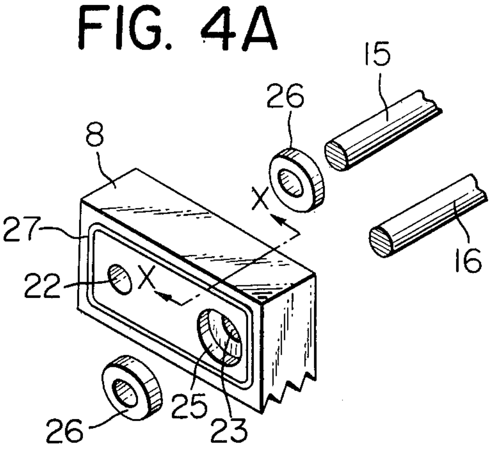
FIG. 4A is a perspective view of an insulating spacer with its associated parts.
Figure 4B:
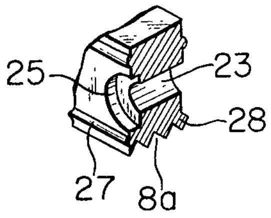
FIG. 4B is a sectional view taken along the line X—X of FIG. 4A.

As shown in FIGS. 4A and 4B, the spacer 8 is made of a soft rubber such as a silicon rubber with a higher degree of electrical isolation and is formed with holes 22 and 23 through which are extended the electrode rods 15 and 16. One end 25 of the hole 23 is counterbored while one end 24 (not shown) of the hole 22 opposite to the counterbored end 25 of the hole 23 is also counterbored. When the deflection plates 7 are overlaid over the surfaces of the spacer 8, electrically-conductive O-rings 26 are fitted into the counterbored ends 24 and 25 of the holes 22 and 23 so that positive electrical contacts between the thin-film electrodes 18 and 19 of the deflection plates 7 and the electrode rods 15 and 16 can be established. Thread-like beat packings 27 and 28 are formed on the major surfaces of the spacer 8 so that the deflection plates are pressed against them when assembled. The bottom 8*a* of the spacer 8 is formed with a plurality of parallel grooves triangular in cross section so that the surface area of the bottom 8*a* facing the path of ink drops between the thin-film electrodes 18 and 19 of the deflection plates 7 is increased.

In assembly, the deflection plates 7 and the spacers 8 are interleaved and the retaining members 9 and 10 are attached to the ends of the array of the deflection plates 7 and the spacers 8. Next the electrode rods 15 and 16 are extended through the holes of the retaining members 9 and 10, the deflection plates 7 and the spacers 8, and the nuts 14 are threadably mounted on the threaded ends of the electrode rods 15 and 16, whereby the deflection plate array 3 can be securely assembled.

When the nozzle array 1 has 60 nozzles spaced apart from each other by 5 mm. 60 spacers 8 and 61 deflection plates 7 are interleaved. Therefore, the length of the deflection plate array 3 becomes 306 mm, but when the nuts 14 are tightened, the beat packings 27 and 28 are compressed slightly so that the length is reduced to 300 mm. In this case, over the whole length, the opposing thin-film electrodes 18 and 19 are spaced apart from each other by the pitch of 5 mm within a tolerance of ±0.3 mm. This means that the deflection plates 7 and the spacers 8 are assembled with a higher degree of accuracy.

The terminals 13 are clamped between the retaining member 9 and the nuts 14 and joined by soldering or the like to one ends of the wires 3*b*. The waterproof rubber caps 11 and 12 are mounted on the retaining members 9 and 10, thereby water-tightly sealing the ends of the electrode rods 15 and 16.

As described previously, the electrically-conductive O-rings 26 are fitted into the counterbored ends 24 and 25 of the holes 22 and 23 of the spacers 8. Therefore, the inner peripheral surfaces of the O-rings 26 are made into electrical contact with the electrode rods 15 and 16 while the outer peripheral surface, into electrical contact with the thin-film electrodes 18 and 19 surrounding the holes 20 and 21 of the deflection plates 7. Thus the positive electrical contacts can be established between the electrode rods 15 and 16 and the thin-film electrodes 18 and 19.

Figure 5:
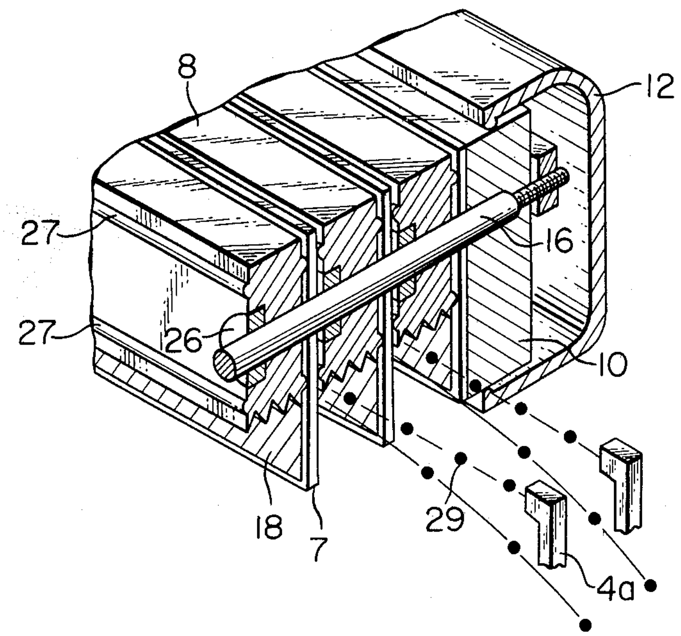
FIG. 5 is a fragmentary perspective view, partly in section and on enlarged scale, of the deflection plate array.

FIG. 5 is a fragmentary view, partly in section and on enlarged scale of the assembled deflection plate array. The ink drops 29 pass between the thin-film electrodes 18 and 19 as shown.

In summary, according to the present invention, the deflection plates 7 and the spacers with the thread-like beat packings 27 and 28 on their major surfaces are interleaved and the sub-assembly of such deflection plates and spacers is sandwiched by the retaining members 9 and 10. Thereafter the electrode rods 15 and 16 are extended through the holes of the retaining members 9 and 10, the deflection plates 7 and the spacers 8, and the sub-assembly is tightly compressed by tightening the screws 14 on the ends of the electrode rods 15 and 16. Thus, as described elsewhere, they can be assembled with a higher degree of dimensional accuracy. In addition, the deflection plates 7 are pressed against the thread-like beat packings 27 and 28 on the spacers 8 surrounding the electrical contacts between the electrode rods 15 and 16 and the thin-film electrodes 18 and 19 so that the latter can be kept free from moisture. Furthermore, the ends of the electrode rods 15 and 16 extended out of the retaining members 9 and 10 are completely water-tightly sealed with the caps 11 and 12 so that electrical failures such as short-circuits can be avoided. Moreover, the positive electrical connections between the electrode rods 15 and 16 and the thin-film electrodes 18 and 19 of the deflection plates can be ensured by virtue of the electrically-conductive O-rings 26. As a result, opposed to the prior art deflection plate arrays, connections of wires to as many as 60 thin-film electrode pairs can be eliminated and consequently considerable saving in time can be attained in assembly. Furthermore, the path between each thin-film electrode pair is opened at the bottom so that the deflection plates 7 can be prevented from being contaminated with the ink drops which drip when the print head is started or stopped. Even when the deflection plates 7 are contaminated, they are readily accessible for cleaning. Thus, excellent maintainability is offered. Moreover, even when the deflection plates 7 are made of insulating and porous material such as ceramic, except the thin-film electrodes 18 and 19 they are coated with waterproof films. As a result, no voltage breakdown occurs even when the deflection plates 7 are cleaned with water or any other suitable cleaning agent. Humidity in the path between the thin-film electrode pairs becomes very high because of the evaporation of ink. Furthermore, when the deflection plates 7 which is 1.5 mm in thickness are spaced apart from each other by 5 mm as described above, the spacing between the adjacent deflection plates 7 becomes as small as 3.5 mm, and a high voltage of the order of 2 to 4 is applied across such small spacing. However, the bottom 8*a* of the spacer 8 is formed with valleys and ridges as described above so that the apparent distance over the spacer 8 between the deflection plates 7 is increased and consequently a higher degree of electrical isolation can be ensured.

Figure 6:
FIG. 6 is a perspective view of an electric connector which may be used instead of an electrically conductive O-ring shown in FIG. 4A.

Instead of the O-rings 26, a washer-like connector 30 as shown in FIG. 6 may be used for establishing the positive electrical connections between the electrode rods 15 and 16 and the thin-film electrodes 18 and 19 of the deflection plates 7.

Figure 7:
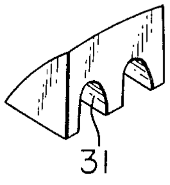
FIG. 7 shows a modification of grooves formed in the bottom of the insulating space shown in FIG. 4B.

Instead of the grooves triangular in cross section formed in the bottom 8*a* of the spacer 8, grooves 31 semicircular in section may be formed as shown in FIG. 7.

What is claimed is:

1. In an electrostatic deflection type ink-jet printer, a deflection plate array characterized in that a plurality of deflection plates each consisting of an insulating substrate and thin-film electrodes formed on the major surfaces thereof, respectively, and a plurality of insulating spacers are interleaved;

two electrode rods are extended through the array of interleaved deflection plates and spacers in such a way that one of said two electrode rods is electrically connected to one of the thin-film electrodes on one major surface of each deflection plate while the other electrode is electrically connected to the other thin-film electrode on the other major surface of each deflection plate; and said deflection plates and said spacers are so interleaved that the portion of each deflection plate bearing said thin-film electrodes is extended downward beyond the bottom of the corresponding spacer.

2. A deflection plate array as set forth in claim 1 wherein said deflection plates are coated with an insulating film except said thin-film electrodes thereon.

3. A deflection plate array as set forth in claim 1 wherein the electrical connection between said one electrode rod and said one thin-film electrode on the deflection plate is established with an O-ring which is electrically conductive and is snugly fitted into one end of an electrode rod hole of the spacer, said one end being counterbored.

4. A deflection plate array as set forth in claim 1 wherein the major surface of each spacer against which are pressed the deflection plate are provided with thread-like beat packings which surround electrode holes of the spacer.

5. A deflection plate array as set forth in claim 1 wherein the bottom of each spacer is formed with a plurality of longitudinally extended grooves so that the distance between the adjacent deflection plates over the bottom of the spacer is increased.

* * * * *